Nov. 17, 1953   T. E. LEONTIS ET AL   2,659,136
COMPOSITE ALLOY
Filed Aug. 16, 1950

INVENTORS.
Thomas E. Leontis
BY Robert S. Busk

Griswold & Burdick
ATTORNEYS

Patented Nov. 17, 1953

2,659,136

UNITED STATES PATENT OFFICE 2,659,136

COMPOSITE ALLOY

Thomas E. Leontis and Robert S. Busk, Midland, Mich., assignors to The Dow Chemical Company, Midland, Mich., a corporation of Delaware Application August 16, 1950, Serial No. 179,780

3 Claims. (Cl. 29—182.2)

The invention relates to a magnesium-base alloy article. It more particularly concerns a composite alloy comprising the conventionl magnesium-base magnesium-zinc-manganese alloy.

The term "magnesium-base alloy" used herein means a magnesium alloy containing at least 80 per cent of magnesium by weight.

The invention is predicated upon the discovery that by die-expressing at elevated temperature the conventional magnesium-base magnesium-zinc-manganese alloy in particulated form in admixture with a particulated tin constituent a high strength solid composite alloy extrusion is obtained. Metallographic examination reveals a new type of structure in a magnesium-base alloy article. The structure is essentially multimetallic. Each of the particulated metals of the mixture which is extruded is changed to the form of an elongated particle with its long axis parallel to that of the extrusion. The elongated particles are all welded, one to the other, into a solid mass without voids. The composite alloy extrusion of the invention may be subjected to the same kinds of metal working operations in use on conventional magnesium-base alloys such as rolling, forging, drawing, welding, electroplating, heat treating, etc., yielding articles of superior strength and other desirable characteristics. The invention then consists of the composite magnesium-base alloy product and method of making the same herein fully described and particularly pointed out in the claims, the following description setting forth several modes of practicing the invention.

In carrying out the invention, any of the conventional ternary magnesium-base alloy compositions (in particulated form) containing zinc and manganese may be used, such as those containing from about 0.5 to 8 per cent of zinc and about 0.5 to 2.5 per cent of manganese. A preferred proportion of zinc is about 4-6 per cent and that of manganese about 1 to 1.5 per cent. The alloy is reduced to particulated form in any suitable way, such as by grinding or atomizing, the atomized form yields superior results and may be produced by forming a melt of the alloy and atomizing it by impinging a jet of a cool gas, e. g. natural gas, against a thin falling stream of the molten alloy. The atomized alloy consists of a mixture of various sized fine spherical rapidly solidified particles, the particles having a fine grain structure. It is desirable to screen out particles coarser than those passing about a 10 to 20 mesh standard sieve.

The tin constituent of the mixture of particulated metals to be extruded may consist of elementary tin or tin alloyed with magnesium, the latter being preferred. Suitable proportions are from about 2 to 20 per cent of tin, the balance being magnesium. The tin constituent may be reduced to particulate form in any convenient manner, such as grinding, although atomization is preferable. The particles size may be similar to or finer than that of the ternary magnesium-base alloy with which it is to be mixed.

The two kinds of particulated metals above described are intimately mixed in any convenient manner to form a uniform mixture which forms the extrusion charge. The relative amounts of the particulated magnesium-base magnesium-zinc-manganese alloy and particulated tin constituent are adjusted so that there is at least 0.5 per cent by weight of tin in the mixture to be extruded. The preferred amount of tin is about 3 per cent, although amounts as high as about 8 per cent of the weight of the mixture may be used. As aforesaid, the tin may be either elementary (unalloyed) or alloyed with magnesium. If the tin is alloyed with magnesium, the relative amounts of the two particulated metals in the extrusion charge may vary over wide limits depending upon the amount of tin in the magnesium-tin alloy used and the amount of tin it is desired to incorporate into the extrusion charge. In any case, the amount of magnesium-tin alloy used relative to that of the ternary magnesium-zinc-manganese alloy should be such as to provide a tin content in the mixture of particulated metals constituting the extrusion charge of from about 0.5 to 8 per cent of the weight of the extrusion charge.

The mixture of particulated metals is charged into the heated container of a ram extruder, having a suitable size container and die opening and subjected to extrusion pressure to cause the charge of mixed particulated metals to be heated and extruded through the die opening.

As to the extrusion conditions, the temperature of the mixed particulated metals in the container may be about the same as that conventionally employed for extruding solid ingots of the known magnesium-base magnesium-zinc-manganese alloys, e. g. 600°–850° F. The ratio of the cross-sectional area of the extrusion container to that of the die opening has a material effect on the mechanical properties of the composite extrusion product obtained. A desirable ratio is at least about 30 to 1, although ratios as high as 150 to 1 or more may be used. The speed of extrusion may be varied over a wide range and depends to some extent upon the size and shape of the die opening. In any case, the extrusion speed is to be held down to that at which the extrusion produced is free from hot shortness. A safe extrusion speed may be ascertained by visual examination of the product as it extrudes, the hot shortness being evident as cracks in the extruded product and sharply reduced strength.

The invention may be further illustrated and explained in connection with the accompanying drawing in which.

Figure 1:
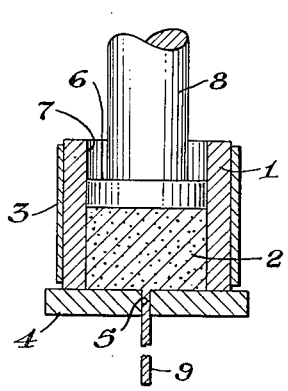
Fig. 1 shows a schematic sectional elevation of an extrusion apparatus suitable for use in practicing the invention.

As shown, the apparatus comprises, in its three forms, an extrusion container 1 adapted to confine a charge 2 of the mixture of metal particles to be compacted and extruded. The container is provided with a heating element 3. In Fig. 1, one end of the container 1 is closed by the die plate 4 in which is provided the die opening 5. In this form of the apparatus, the charge 2 is caused to be compacted in the container and extruded through the die opening 5 by application of pressure by means of the dummy block 6 forced into the bore 7 of the container by the ram 8 to form the extrusion 9.

Figure 2:
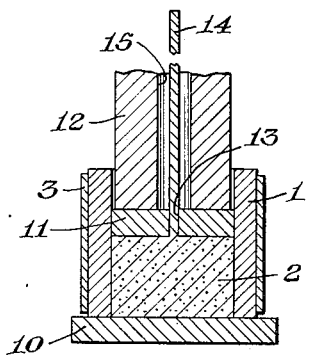
Fig. 2 is a similar view to Fig. 1 showing a modification of the apparatus.

In the form of the apparatus shown in Fig. 2, the container 1 is closed at one end by the plate 10. The other end of the container receives the die block 11 carried by the hollow ram 12 which forces the die block into the container causing the charge 2 to be compacted and to extrude through die opening 13 to form the extrusion 14 which extends into bore 15 of the hollow ram 12.

Figure 3:
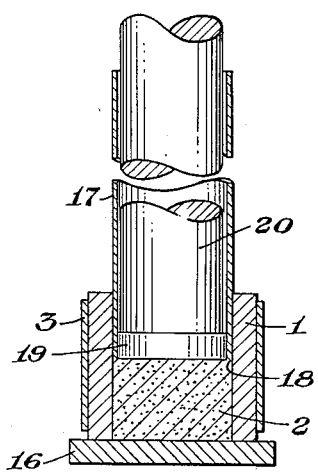
Fig. 3 is a similar view to Fig. 1 showing another modification of the apparatus.

In the modification of Fig. 3, the container is closed at one end with a plate 16. The charge 2 is extruded as a tubular extrusion 17 through the annulus 18 around the die block 19 while it is forced into the container by the ram 20.

The forms of the apparatus shown are conventional.

By putting a charge of the mixture of the metals involved under pressure while at heat, as with the apparatus shown, the mixture of metal particles is compacted but not subjected to further mixing before extrusion. The metals originally in the charge as individual metal particles do not lose their original distinctive composition except at the surfaces of the union of the different metal particles which become extended and lengthened during extrusion. At these surfaces, during extrusion or heat treatment, some diffusion of metal takes places between the magnesium-zinc-manganese alloy particles and the tin-containing particles, forming composite alloy.

The following examples, set forth in the table below, are illustrative of the invention:

*Table*

| Example No.—Blank No. | Composition of extrusion charge in parts by weight of particulated magnesium alloy A mixed with particulated tin constituent B | | | | Extrusion temp., °F. | Mechanical properties of extrusions [1] in 1000's p. s. i. | | | | | | | |
|---|---|---|---|---|---|---|---|---|---|---|---|---|---|
| | Weight per-cent A | Analysis of A | Weight per-cent B | Analysis of B | | ASX | | Aged | | H. T. | | H. T. A. | |
| | | | | | | TYS | TS | TYS | TS | TYS | TS | TYS | TS |
| Blank 1 | 100 | 3.9% Zn, 1.2% Mn, bal. mg. | None | | 675 | 30 | 41 | 42 | 48 | 29 | 39 | 38 | 44 |
| Example 1 | 99.5 | ___do___ | 0.5 | 100% Sn | 675 | 33 | 44 | 43 | 49 | 23 | 36 | 33 | 45 |
| Example 2 | 99.0 | ___do___ | 1.0 | ___do___ | 700 | 32 | 45 | 41 | 49 | 22 | 36 | 32 | 41 |
| Example 3 | 97.0 | ___do___ | 3.0 | ___do___ | 680 | 34 | 45 | 44 | 49 | 23 | 36 | 34 | 41 |
| Example 4 | 99.0 | ___do___ | 6.0 | ___do___ | 700 | 37 | 47 | 47 | 51 | 27 | 40 | 26 | 43 |
| Blank 2 | 100 | 6.6% Zn, 1.53% Mn, bal. mg. | None | | 700 | 32 | 47 | 41 | 48 | 18 | 40 | 25 | 45 |
| Example 5 | 75.0 | ___do___ | 25.0 | 4.26% Sn, bal. mg. | 700 | 32 | 45 | 41 | 48 | 28 | 44 | 35 | 44 |
| Example 6 | 50.0 | ___do___ | 50.0 | ___do___ | 700 | 30 | 44 | 34 | 46 | 28 | 42 | 30 | 43 |
| Example 7 | 25.0 | ___do___ | 75.0 | ___do___ | 700 | 30 | 44 | 34 | 46 | 28 | 42 | 30 | 43 |
| Blank 3 | None | | 100 | ___do___ | 675 | 30 | 40 | 31 | 40 | 25 | 40 | 26 | 40 |

[1] ASX = as extruded.
Aged = heat treated 16 hours at 350° F.
H. T. = heat treated 1 hour at 750° F.
H. T. A. = heat treated 1 hour at 750° F. followed by heating for 16 hours at 350° F.
TYS = tensile yield strength, defined as the load at which the stress strain curve deviates 0.2% from the modulus line.
TS = tensile strength.

In making the extrusions shown in the foregoing table, the zinc- and manganese-containing magnesium-base alloy was in atomized form, the particles of which were of various sizes substantially all passing through a 20 mesh standard sieve but not a 200 mesh sieve. The tin constituent was in atomized form, the particles being somewhat finer than those of the zinc- and manganese-containing magnesium-base alloy. The particulated metals were mixed together in the proportions indicated to form the extrusion charges of the composition shown, and extruded with apparatus similar to that of the Fig. 1. Blanks of the individual metals (alloys and tin) were also extruded under conditions comparable to those of the mixtures for comparison. The rate of extrusion was up to about 5 feet per minute.

In Examples 1 to 4, inclusive, the tin constituent is unalloyed tin; in Examples 5 to 7, inclusive, the tin constituent is a binary magnesium-base magnesium-tin alloy. The amount of tin contributed by the binary magnesium-base magnesium-tin alloy to the extrusion charge in Example 5 is about 1 per cent; in Example 6 about 2 per cent; and in Example 7 about 3 per cent. The ratio of the cross-sectional area of the extrusion container to that of the die opening was about 34:1 and the extrusions produced were wire 0.086 inch in diameter. The extrusions of the Examples 1 to 7, inclusive, were of multimetallic structure of elongated metal particles all oriented in the same direction and welded together without voids.

We claim:

1. The method of making a solid composite high strength metal article comprising a magnesium-base alloy containing 0.5 to 8 per cent of zinc and 0.5 to 2.5 per cent of manganese the balance of the alloy being magnesium which consists in forming a mixture of the magnesium-base alloy in particulate form and a particulated tin constituent, the tin content amounting to from about 0.1 to 8 per cent of the weight of the mixture the remainder of the mixture being the said alloy, and die-expressing the mixture at a temperature from 600° to 850° F.

2. The method according to claim 1 in which the zinc content of the magnesium-base alloy is 4 to 6 per cent and the manganese content is 1 to 1.5 per cent, and the particulated tin constituent is alloyed with magnesium in the proportions of about 2 to 20 per cent by weight, the proportions of the alloyed tin in the mixture being about 0.5 to 8 per cent thereof by weight.

3. A composite metal body consisting of two particulated metals one of the metals being a magnesium-base magnesium-zinc-manganese alloy containing from 0.5 to 8 per cent of zinc, 0.5 to 2.5 per cent of manganese, the balance being magnesium, the other comprising tin in amount from 0.1 to 8 per cent of the weight of the body, particles of each particulated metal being elongated, oriented in the same direction and welded together into an integral solid.

THOMAS E. LEONTIS.
ROBERT S. BUSK.

References Cited in the file of this patent

UNITED STATES PATENTS

| Number | Name | Date |
|---|---|---|
| 1,913,133 | Stout | June 6, 1933 |
| 2,024,767 | Jeffries et al. | Dec. 17, 1935 |
| 2,205,865 | Schwarzkoff | June 25, 1940 |
| 2,332,277 | Stern | Oct. 29, 1943 |
| 2,355,954 | Cremer | Aug. 15, 1944 |

FOREIGN PATENTS

| Number | Country | Date |
|---|---|---|
| 570,166 | Great Britain | June 26, 1945 |
| 570,906 | Great Britain | July 27, 1945 |
| 625,364 | Great Britain | June 27, 1949 |

OTHER REFERENCES

"Treatise on Powder Metallurgy," by Goetzel, vol. 2, pp. 500, 740, 741, 1950.

"Symposium on Powder Metallurgy," published by American Society for Metals, March 3, 1943. Pages 42 and 43.